US012771009B2

(12) United States Patent
Kusumoto et al.

(10) Patent No.: US 12,771,009 B2
(45) Date of Patent: Oct. 20, 2026

(54) IMAGING APPARATUS

(71) Applicant: FUJIFILM Corporation, Tokyo (JP)

(72) Inventors: Naoya Kusumoto, Saitama (JP); Masahiko Miyata, Saitama (JP); Shingo Ogawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 194 days.

(21) Appl. No.: 18/674,893

(22) Filed: May 26, 2024

(65) Prior Publication Data

US 2024/0405405 A1 Dec. 5, 2024

(30) Foreign Application Priority Data

May 30, 2023 (JP) ................................ 2023-089089

(51) Int. Cl.
*H01Q 1/22* (2006.01)

(52) U.S. Cl.
CPC .................................... *H01Q 1/22* (2013.01)

(58) Field of Classification Search
CPC ....................................................... H01Q 1/22
See application file for complete search history.

(56) References Cited

U.S. PATENT DOCUMENTS 6,027,366 A * 2/2000 Mori .................. H01R 12/7076 439/495
9,354,673 B2 * 5/2016 Sakakibara ........... G06F 1/1698
2016/0198070 A1 * 7/2016 Nakano .................. H04N 23/57 348/374
2017/0318210 A1 * 11/2017 Harada .................. G03B 17/08
2021/0175608 A1 * 6/2021 Ramasamy .......... H01Q 1/2266
2023/0209701 A1 * 6/2023 Bae ........................ H01Q 1/243 343/700 R
2024/0179385 A1 * 5/2024 Yasunaga ............... H01Q 21/28

FOREIGN PATENT DOCUMENTS

JP 2001333307 11/2001
JP 2007060237 3/2007

* cited by examiner

*Primary Examiner* — Hai V Tran
(74) *Attorney, Agent, or Firm* — JCIPRNET

(57) ABSTRACT

In a metal housing of an imaging apparatus, a wireless module in which a wireless antenna is installed and a flat cable are provided. A through-hole for the flat cable is formed in the metal housing. The wireless antenna is disposed at a position where the wireless antenna does not overlap with the flat cable and is disposed at a position where the wireless antenna overlaps with the through-hole.

13 Claims, 8 Drawing Sheets

IMAGING APPARATUS

CROSS-REFERENCE TO RELATED APPLICATIONS

The present application claims priority under 35 U.S.C. § 119 to Japanese Patent Application No., 2023-089089 filed on May 30, 2023. The above application is hereby expressly incorporated by reference, in its entirety, into the present application.

BACKGROUND

1. Technical Field

The present disclosed technology relates to an imaging apparatus.

2. Description of the Related Art

Described in JP2007-060237A is a camera having a wireless communication function. In the case of the camera described in JP2007-060237A, a wireless communication substrate, on which a wireless communication circuit and a grounded-type antenna are mounted, is disposed inside a metal cover and the antenna is grounded via the metal cover. In JP2007-060237A, an opening for protrusion of the antenna is formed in a predetermined surface of the metal cover and the wireless communication substrate is disposed to be inclined with respect to the predetermined surface such that the antenna which is provided on one end side of the wireless communication substrate protrudes outward through the opening.

Described in JP2001-333307A is an imaging apparatus having a communication function inside a case main body. In JP2001-333307A, the case main body is formed of metal, a part of the case main body is formed of a material other than the metal, and a communication function antenna is provided inside the material other than the metal.

SUMMARY

One embodiment according to the present disclosed technology provides an imaging apparatus with which it is possible to improve wireless communication performance with a simple and efficient configuration.

An imaging apparatus according to an aspect of the present disclosure is an imaging apparatus comprising a wireless module in which a wireless antenna is installed, a flat cable, and a metal housing in which the wireless module and the flat cable are provided. The wireless antenna is disposed at a position where the wireless antenna does not overlap with the flat cable as seen along a first direction, and the wireless antenna is disposed at a position where the wireless antenna overlaps with a through-hole for the flat cable, the through-hole being formed in the metal housing.

The wireless module is preferably disposed at a position where the wireless module overlaps with the through-hole as seen along the first direction.

In a case where a surface of an apparatus main body in which an imaging lens is disposed is a first surface, the first direction is preferably a direction as seen from the first surface.

In a case where a surface of an apparatus main body in which an imaging lens is disposed is a first surface and a surface of the apparatus main body that faces the first surface is a second surface, the first direction is preferably a direction as seen from the second surface.

In a case where a surface of an apparatus main body in which an imaging lens is disposed is a first surface, a surface of the apparatus main body that faces the first surface is a second surface, and a surface of the apparatus main body that connects the first surface and the second surface to each other and on which an operation member is not disposed is a third surface, the first direction is preferably a direction as seen from the third surface.

The operation member is preferably disposed on a surface other than the third surface.

The flat cable is preferably connected to the wireless module.

The wireless module preferably includes a substrate on which the wireless antenna is mounted, and the flat cable is preferably connected to the wireless module via the substrate.

The flat cable preferably has a shape that does not cover the wireless antenna as seen along the first direction.

A cutout for avoidance of the wireless antenna is preferably formed at the flat cable.

A direction in which a wiring line in the flat cable extends preferably changes at a position facing the wireless antenna as seen along the first direction.

A wiring line in the flat cable is preferably bent at a position facing the wireless antenna as seen along the first direction.

The wireless module preferably has a rectangular shape and is preferably disposed to be inclined with respect to a wiring direction of the flat cable.

BRIEF DESCRIPTION OF THE DRAWINGS

Exemplary embodiments according to the technique of the present disclosure will be described in detail based on the following figures, wherein.

DETAILED DESCRIPTION

Figure 1:
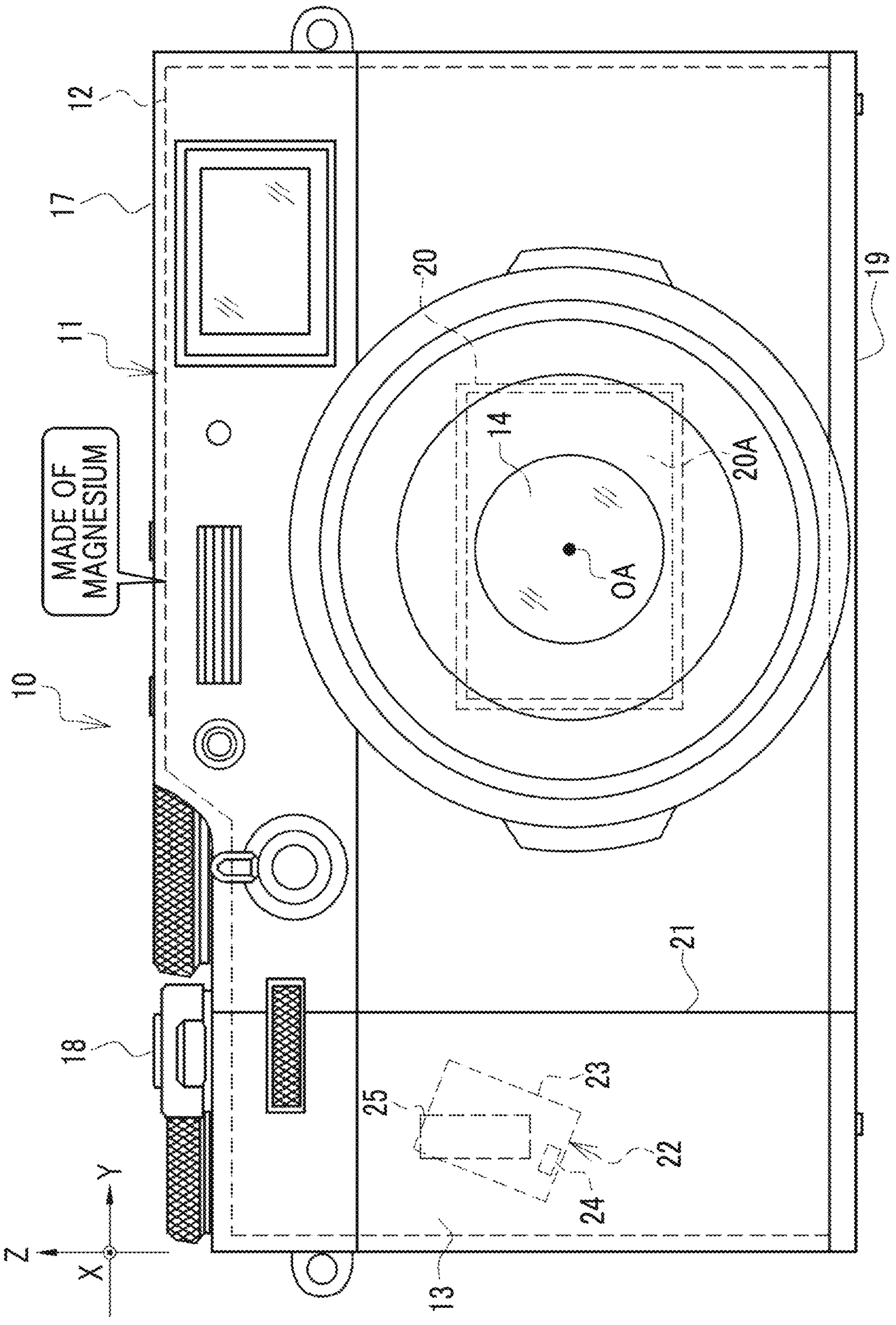
FIG. 1 is a front view of an imaging apparatus.
Figure 2:
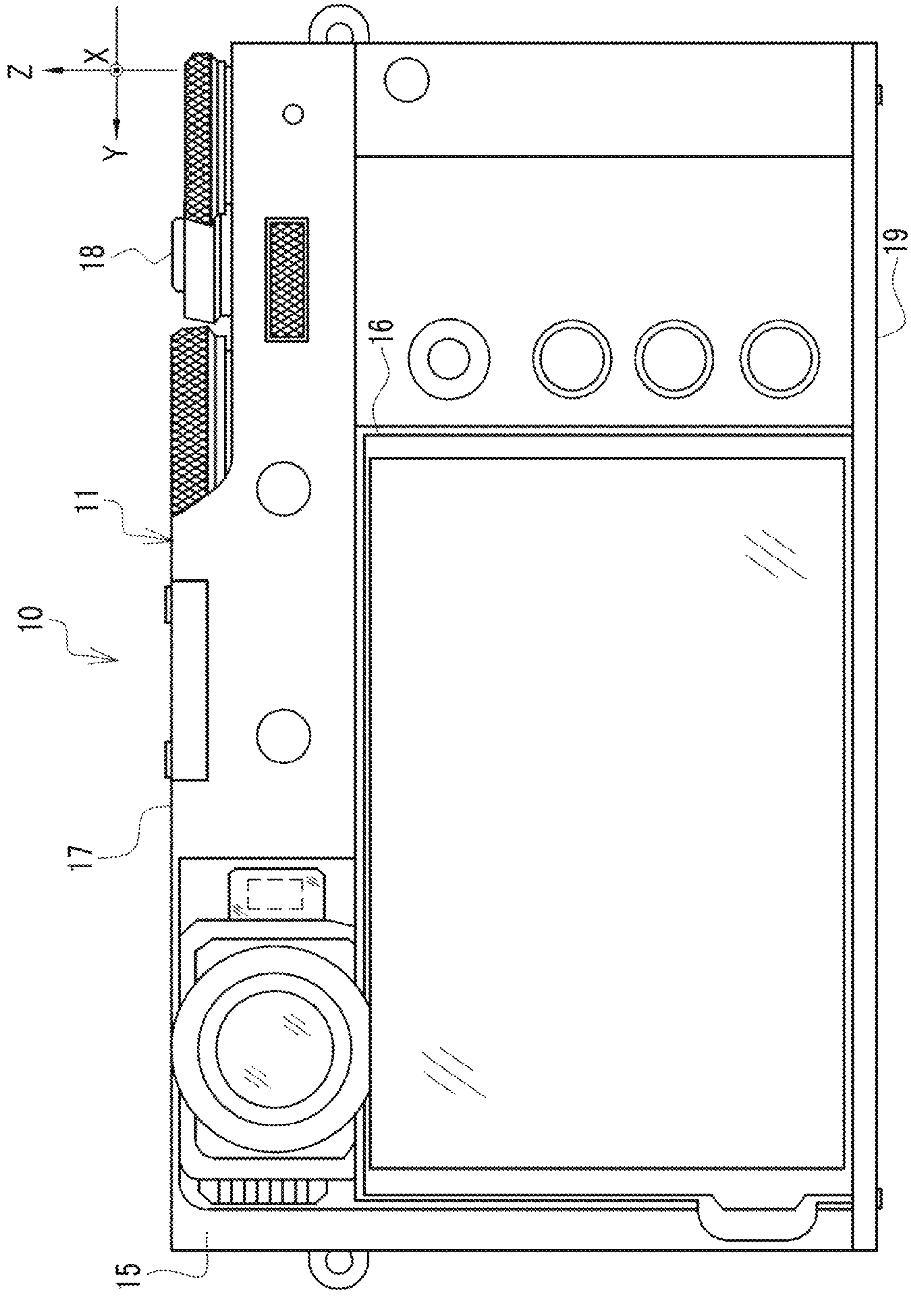
FIG. 2 is a rear view of the imaging apparatus.

For example, as shown in FIGS. 1 and 2, an imaging apparatus 10 is a compact digital camera and comprises an apparatus main body 11. The apparatus main body 11 has a configuration in which a metal housing 12 made of, for example, magnesium is covered with a resin cover or the like. An imaging lens 14 or the like is disposed at a front surface 13 of the apparatus main body 11. In addition, a liquid crystal monitor 16 or the like is disposed at a rear surface 15 of the apparatus main body 11, the rear surface 15 facing the front surface 13. Furthermore, various operation members, such as a power switch-integrated release button 18, are disposed at a top surface 17 of the apparatus main body 11, the top surface 17 connecting the front surface 13 and the rear surface 15 to each other. A tripod screw hole (not shown) or the like is disposed at a bottom surface 19 of the apparatus main body 11, the bottom surface 19 being another surface connecting the front surface 13 and the rear surface 15 to each other. However, various operation members as those on the top surface 17 are not disposed at the bottom surface 19. The front surface 13 is an example of a "first surface" according to the present disclosed technology. The rear surface 15 is an example of a "second surface" according to the present disclosed technology. The top surface 17 is an example of a "surface other than a third surface" according to the present disclosed technology. In addition, the bottom surface 19 is an example of a "third surface" according to the present disclosed technology. Note that the imaging apparatus 10 may be a lens-interchangeable camera in which the imaging lens 14 is interchangeable.

An imaging element 20 is disposed inside the imaging lens 14. The imaging element 20 is, for example, a complementary metal oxide semiconductor (CMOS) image sensor or a charge coupled device (CCD) image sensor. The imaging element 20 includes a rectangular imaging surface 20A used to image a subject. Two sides of the imaging surface 20A, which are orthogonal to each other, are parallel to a Y-axis direction and a Z-axis direction, respectively. In addition, the center of the imaging surface 20A coincides with an optical axis OA of subject light incident through the imaging lens 14. The imaging surface 20A receives subject light. As is well known, on the imaging surface 20A, pixels that photoelectrically convert the received subject light and output the subject light in the form of electric signals are arranged in a two-dimensional manner along the Y-axis direction and the Z-axis direction.

Here, in a case where the bottom surface 19 of the apparatus main body 11 is placed on a horizontal surface, the Y-axis direction is a horizontal direction and the Z-axis direction is a vertical direction. The Y-axis direction is a width direction of the apparatus main body 11 and the Z-axis direction is a height direction of the apparatus main body 11. Note that in the present specification, a term related to an angle like "being orthogonal" means not only being perfectly orthogonal but also means being substantially orthogonal with an error allowed in design and manufacturing (for example, an error of about ±10% from a design value). In addition, a term "being parallel" means not only being perfectly parallel but also means being substantially parallel with an error allowed in design and manufacturing (for example, an error of about ±10% from a design value). In addition, a term "to coincide" means not only to perfectly coincide but also means to substantially coincide with an error allowed in design and manufacturing (for example, an error of about ±10% from a design value).

A grip portion 21 on which a right hand of a user is placed during an imaging operation or the like is provided at a left portion of the front surface 13. A wireless module 22 is disposed at a position close to an upper center portion in the grip portion 21, that is, in the metal housing 12. The wireless module 22 is provided to wirelessly transmit various kinds of data such as a captured image to the outside and wirelessly receive various kinds of data such as a software update program from the outside. The wireless module 22 includes a rectangular substrate 23, a wireless antenna 24 mounted at a lower portion of the substrate 23, and a connector 25 provided at a rear surface of the substrate 23. The substrate 23 is disposed such that a front surface and the rear surface thereof are parallel to a YZ plane. Therefore, normal lines of the front surface and the rear surface of the substrate 23 are parallel to an X-axis direction which is orthogonal to the Y-axis direction and the Z-axis direction. In a case where the bottom surface 19 of the apparatus main body 11 is placed on a horizontal surface, the X-axis direction is a horizontal direction as with the Y-axis direction. In addition, the X-axis direction is a depth direction of the apparatus main body 11.

Figure 3:
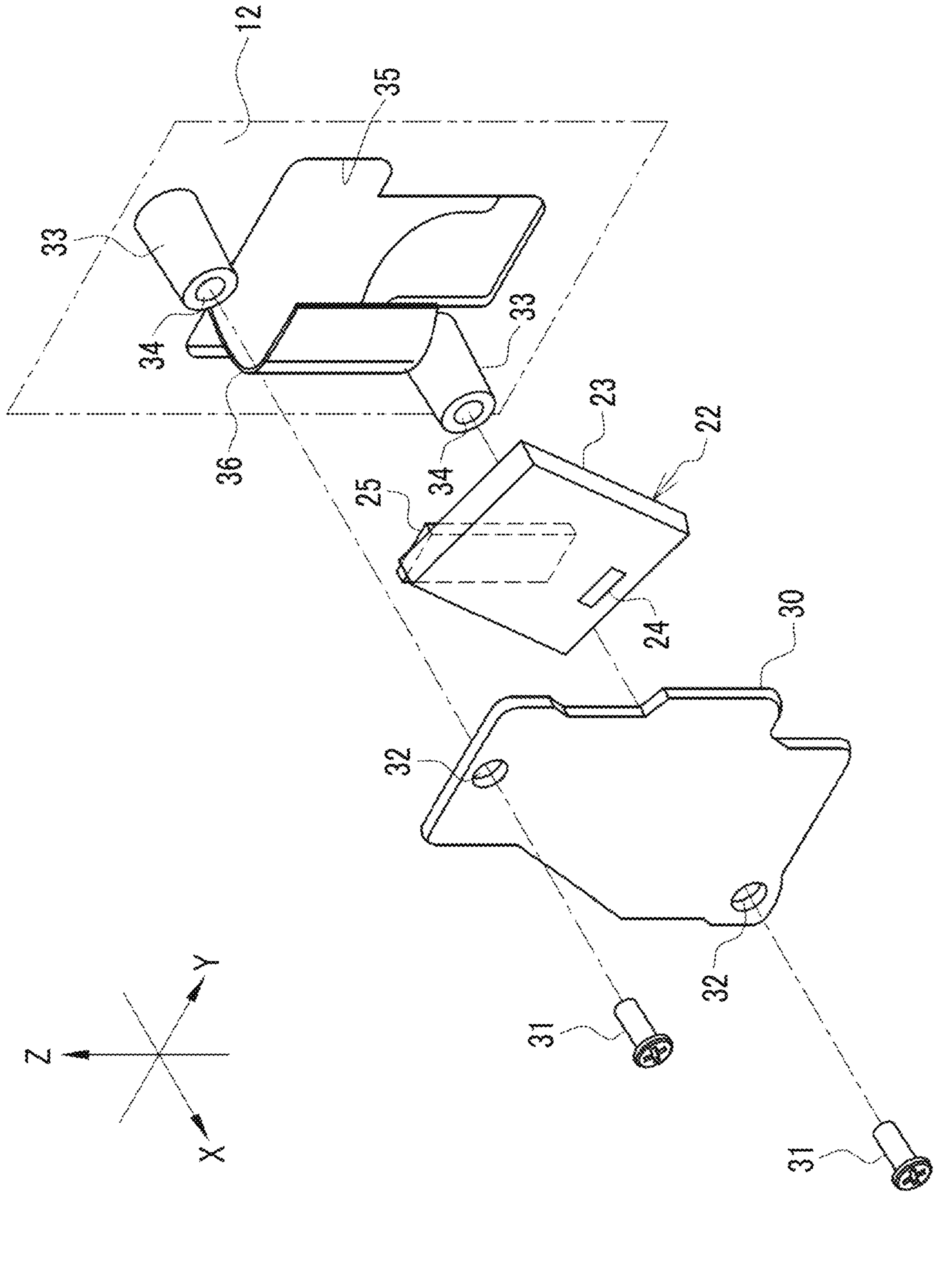
FIG. 3 is an exploded perspective view showing a configuration of a wireless module, an attachment plate, and an attachment position of the wireless module.

For example, as shown in FIG. 3, the wireless module 22 is fixed to the center of a rear surface of an attachment plate 30 via an adhesive or the like and is installed at an attachment position in the metal housing 12 via the attachment plate 30. The attachment plate 30 is, for example, a thin plate made of resin and the area thereof is slightly larger than the area of the wireless module 22. Through-holes 32 for the screws 31 are formed at the center of an upper portion of the attachment plate 30 and a left lower corner of the attachment plate 30.

Meanwhile, at the attachment position of the wireless module 22 in the metal housing 12, two spacers 33 are provided at positions corresponding to the through-holes 32 of the attachment plate 30. The two spacers 33 are provided to stand along the X-axis direction and have the same length as each other. Screw holes 34 are formed in the spacers 33. In a case where the screws 31 are inserted into the through-holes 32 of the attachment plate 30 with the wireless module 22 fixed to the rear surface of the attachment plate 30 and the screws 31 are fastened and fixed at the screw holes 34, the wireless module 22 is held in a state of being separated from the metal housing 12 in the X-axis direction.

A through-hole 35 is formed between the two spacers 33. The area of the through-hole 35 is larger than the area of the wireless module 22 and is smaller than the area of the attachment plate 30. A flat cable 36 passes through the through-hole 35. The flat cable 36 is a cable bundle obtained by connecting a plurality of wiring lines 36A (refer to FIG. 4) for transmission and reception of various kinds of data in one direction and is flexible. That is, the flat cable 36 is a flexible flat cable (FFC). The flat cable 36 is bent at an approximately right angle before passing through the through-hole 35 and after passing through the through-hole 35. One end portion of the flat cable 36 is connected to the connector 25 (refer to FIG. 4). Since the connector 25 is provided at the substrate 23 as described above, the flat cable 36 is connected to the wireless module 22 via the substrate 23. The flat cable 36 is wired inside the metal housing 12, and the other end portion of the flat cable 36 is connected to a control circuit (not shown) of the wireless module 22 which is provided inside the metal housing 12.

Figure 4:
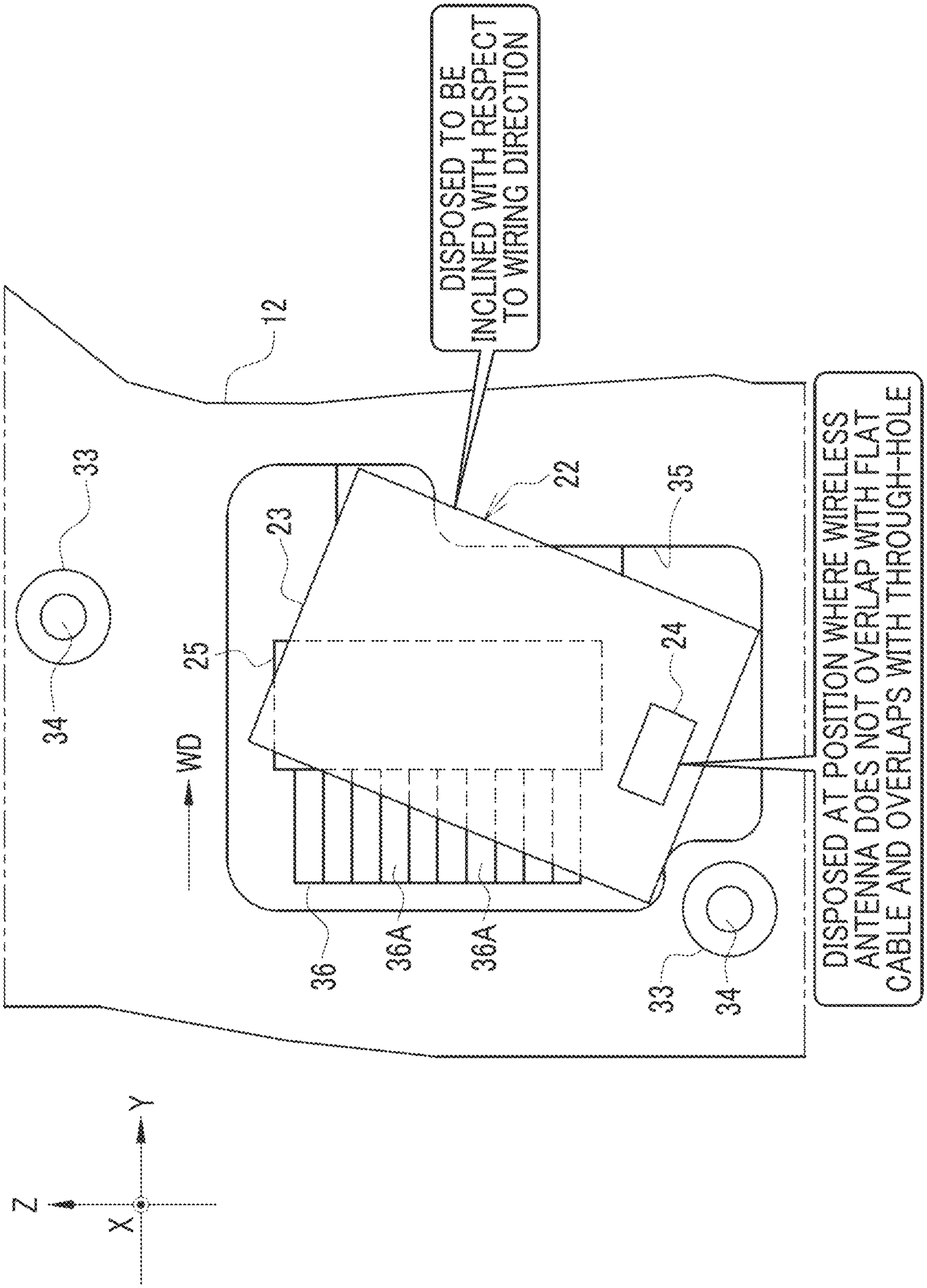
FIG. 4 is a plan view of the wireless module and the attachment position of the wireless module as seen from a front side.
Figure 5:
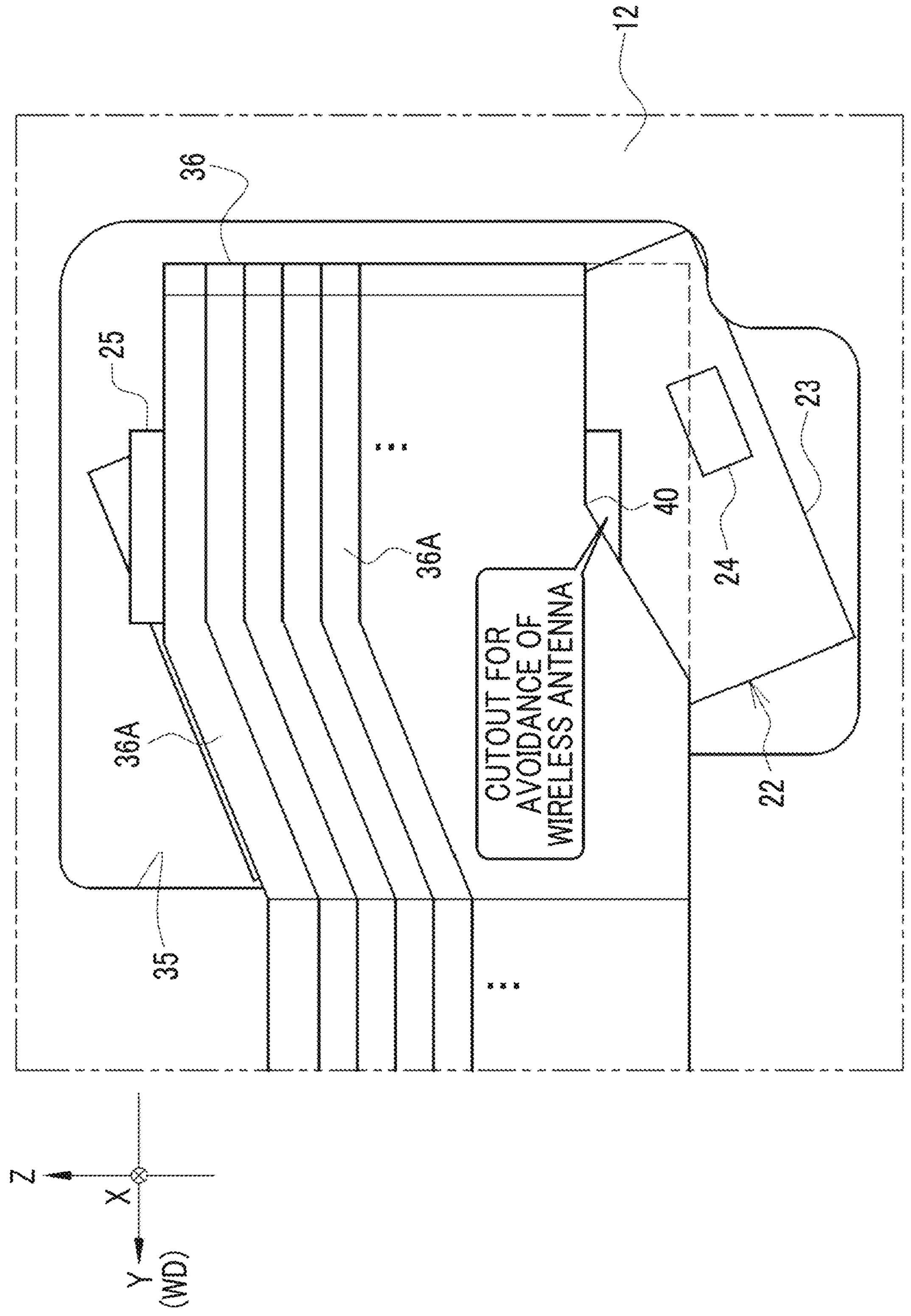
FIG. 5 is a plan view of the wireless module and the attachment position of the wireless module as seen from a rear side.

FIGS. 4 and 5 are plan views showing the wireless module 22 and the attachment position of the wireless module 22 as seen from the front surface 13 side and the rear surface 15 side of the apparatus main body 11. In both FIGS. 4 and 5, the attachment plate 30 is not shown for the sake of convenience of description. In addition, in FIG. 5, a portion of the wiring lines 36A is not shown in order to avoid complication.

As shown in FIGS. 4 and 5, as seen from the front surface 13 and the rear surface 15 of the apparatus main body 11, that is, as seen along the X-axis direction, the wireless module 22, the through-hole 35, and the flat cable 36 overlap with each other at least partially. Specifically, as seen in the X-axis direction, the almost entire wireless module 22 fits in the through-hole 35. That is, the wireless module 22 is disposed at a position where the wireless module 22 overlaps with the through-hole 35. In addition, as seen in the X-axis direction, a major portion of the wireless module 22 is covered with the flat cable 36 (refer to FIG. 5). Since the one end portion of the flat cable 36 passes through the through-hole 35, the flat cable 36 overlaps with the through-hole 35 as seen in the X-axis direction. The X-axis direction is an example of a "first direction" according to the present disclosed technology. Note that the expression "as seen along the X-axis direction" and the expression "as seen in the X-axis direction" have the same meaning as each other.

Particularly, as shown in FIG. 5, the wireless antenna 24 is disposed at a position where the wireless antenna 24 does not overlap with the flat cable 36 as seen along the X-axis direction. In addition, the wireless antenna 24 is disposed at a position where the wireless antenna 24 overlaps with the through-hole 35 as seen along the X-axis direction. The position where the wireless antenna 24 overlaps with the through-hole 35 as seen along the X-axis direction is, in other words, a position where the wireless antenna 24 does not overlap with the metal housing 12 as seen along the X-axis direction.

The substrate 23 is disposed to be inclined with respect to a wiring direction WD of the flat cable 36. In other words, the substrate 23 is disposed in an oblique state where sides of the substrate 23 are not parallel or orthogonal to the wiring direction WD, with the substrate 23 rotated around an X-axis with respect to the wiring direction WD at an angle larger than 0° and smaller than 90°. Here, the wiring direction WD of the flat cable 36 is a direction in which the plurality of wiring lines 36A constituting the flat cable 36 extend at the attachment position of the wireless module 22. In the present example, the wiring direction WD is a direction parallel to the Y-axis direction.

As shown in FIG. 5, the flat cable 36 has a shape that does not cover the wireless antenna 24 as seen along the X-axis direction. More specifically, a cutout 40 for avoidance of the wireless antenna 24 is formed at the flat cable 36. The cutout 40 is formed by changing a direction in which the wiring lines 36A in the flat cable 36 extend at a position facing the wireless antenna 24 as seen along the X-axis direction. In addition, the cutout 40 is formed by bending the wiring lines 36A in the flat cable 36 at the position facing the wireless antenna 24 as seen along the X-axis direction. In other words, the cutout 40 is formed by shifting (to be offset), by a predetermined amount in the Z-axis direction orthogonal to the wiring direction WD, the wiring lines 36A of the flat cable 36 at the position facing the wireless antenna 24, the wiring lines 36A extending toward the wireless antenna 24 along the wiring direction WD.

The wireless module 22 transmits and receives various kinds of data in a wireless manner through the wireless antenna 24. The wireless antenna 24 transmits radio waves of various kinds of data to the outside or receives radio waves of various kinds of data from the outside.

As shown in FIGS. 4 and 5, the wireless antenna 24 is disposed at the position where the wireless antenna 24 does not overlap with the flat cable 36 as seen along the X-axis direction and is disposed at the position where the wireless antenna 24 overlaps with the through-hole 35 as seen along the X-axis direction. Therefore, in the case of transmission and reception of radio waves, the wireless antenna 24 is less likely to be influenced by a radiation noise from the flat cable 36 and is less likely to be influenced by absorption and reflection of radio waves of the metal housing 12. In addition, the through-hole 35 not only reduces the probability of the influence of the absorption and reflection of radio waves of the metal housing 12 but also functions as a hole through which the flat cable 36 passes. Therefore, it is possible to improve wireless communication performance with a simple and efficient configuration.

In addition as shown in FIGS. 4 and 5, the wireless module 22 is disposed at a position where the wireless module 22 overlaps with the through-hole 35 as seen along the X-axis direction. Therefore, it is possible to further reduce the probability of the influence of the absorption and reflection of the radio waves of the metal housing 12, and it is possible to further improve the wireless communication performance.

The flat cable 36 is connected to the wireless module 22. More specifically, the wireless module 22 includes the substrate 23 on which the wireless antenna 24 is mounted and the flat cable 36 is connected to the wireless module 22 via the substrate 23. Since the wireless module 22 communicates with the control circuit at a relatively high speed, the influence of the radiation noise from the flat cable 36 on radio waves transmitted and received by the wireless antenna 24 is considerable. Therefore, an effect in which the wireless antenna 24 is made less likely to be influenced by the radiation noise from the flat cable 36 can be exhibited more.

As shown in FIG. 5, the flat cable 36 has a shape that does not cover the wireless antenna 24. Therefore, it is possible to reduce a probability that the wireless antenna 24 is influenced by the radiation noise from the flat cable 36.

The cutout 40 for avoidance of the wireless antenna 24 is formed at the flat cable 36. The cutout 40 is formed by changing a direction in which the wiring lines 36A in the flat cable 36 extend at a position facing the wireless antenna 24 as seen along the X-axis direction. In addition, the cutout 40 is formed by bending the wiring lines 36A in the flat cable 36 at the position facing the wireless antenna 24 as seen in the X-axis direction. Therefore, it is possible to reduce a probability that the wireless antenna 24 is influenced by the radiation noise from the flat cable 36 with a more simple and efficient configuration.

Figure 6:
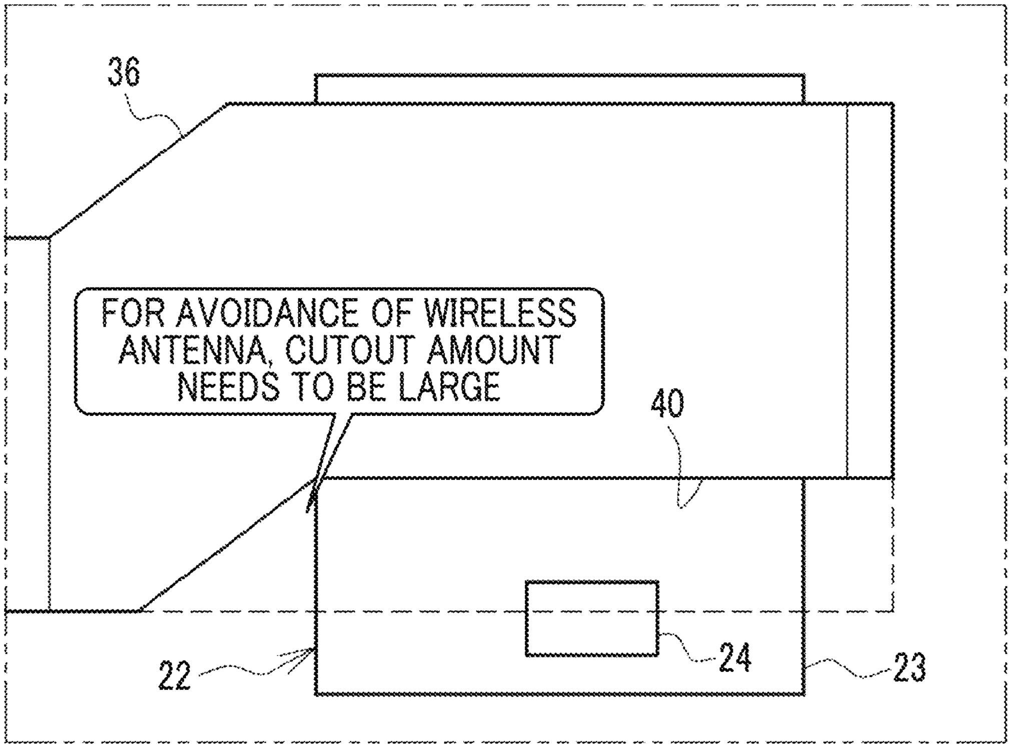
FIG. 6 is a view showing a cutout of a flat cable related to a case where the wireless module is not disposed to be inclined with respect to a wiring direction of the flat cable.

The substrate 23 of the wireless module 22 has a rectangular shape. In addition, as shown in FIG. 4, the substrate 23 is disposed to be inclined with respect to the wiring direction WD of the flat cable 36. It is possible to dispose other components in the grip portion 21 not to overlap with the wireless module 22 by using a space that is obtained since the substrate 23 is disposed to be inclined. In addition, the cutout amount of the cutout 40 can be reduced in comparison with a case where the substrate 23 is not disposed to be inclined as shown in FIG. 6, which is an example.

In terms of influence on radio waves, the through-hole 35 having a larger area results in a more favorable result. However, in terms of strength of the metal housing 12, the through-hole 35 having a smaller area results in a more favorable result. Therefore, it is preferable that the area of the through-hole 35 is set in consideration of the balance between reduction of the influence on radio waves and maintenance of the strength of the metal housing 12.

The flat cable 36 is not limited to the FFC described as an example. A flexible printed circuit (FPC) may also be used.

A position where the wireless module 22 is disposed is not limited to a position inside the grip portion 21, which has been described as an example. For example, the wireless module 22 may be disposed at a right-side portion of the metal housing 12 which is opposite to the grip portion 21. In short, the wireless module 22 may be disposed at any position as long as the wireless module 22 is disposed at a position that is distant from a source of a noise that influences radio waves.

Figure 7:
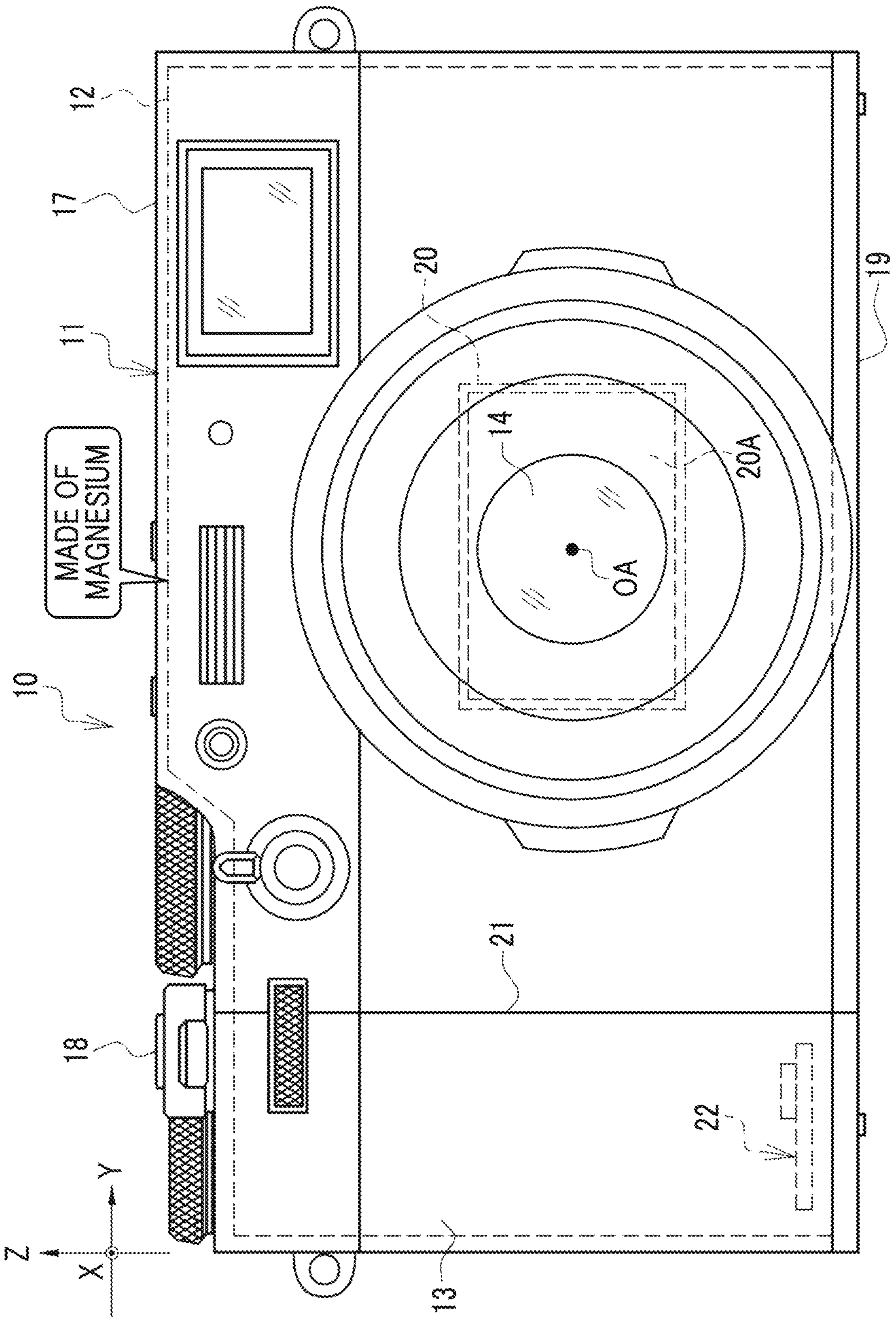
FIG. 7 is a view showing an example in which the wireless module is disposed at a portion of an apparatus main body that faces a bottom surface.
Figure 8:
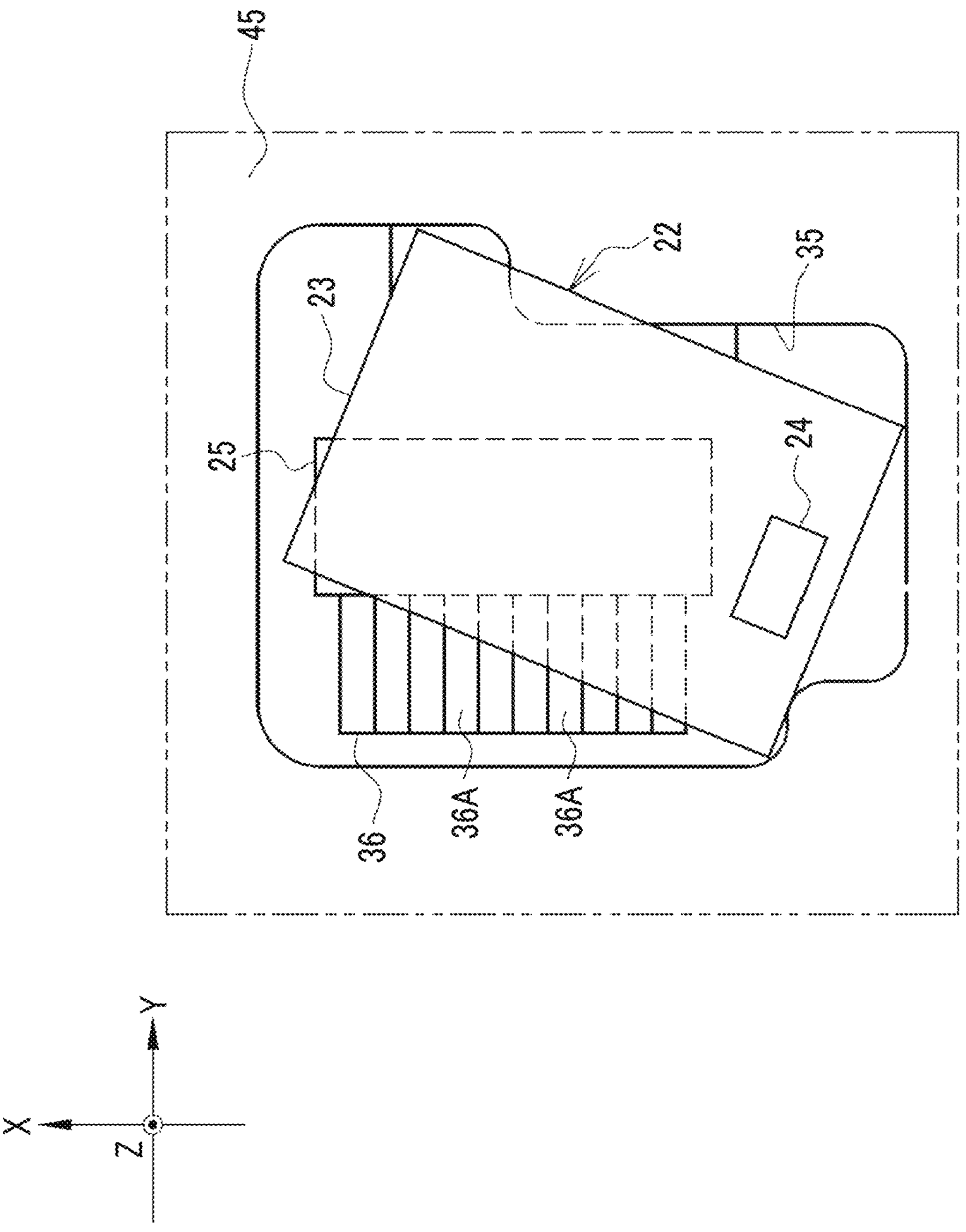
FIG. 8 is a plan view of the wireless module and the attachment position of the wireless module as seen from a bottom side.

In addition, for example, as shown in FIG. 7, the wireless module 22 may be disposed at a portion inside the metal housing 12 that faces the bottom surface 19. In such a case, for example, as shown in FIG. 8, the through-hole 35 is formed in a surface 45 of the metal housing 12 that faces the bottom surface 19. In addition, the wireless antenna 24 is disposed at a position where the wireless antenna 24 does not overlap with the flat cable 36 as seen from the bottom surface 19, that is, as seen along the Z-axis direction. Furthermore, the wireless antenna 24 is disposed at a position where the wireless antenna 24 overlaps with the through-hole 35 as seen along the Z-axis direction. That is, in such a case, the Z-axis direction is an example of the "first direction" according to the present disclosed technology.

In a case where the wireless module 22 is disposed at a portion inside the metal housing 12 that faces the bottom surface 19 as described above, it is possible to reduce a probability that the wireless antenna 24 is influenced by a noise since an operation member, which is a source of the noise that influences radio waves, is not disposed on the bottom surface 19.

The imaging apparatus according to the present disclosed technology may be a single lens reflex digital camera, a smartphone, or a tablet terminal.

It is possible to understand the techniques described in the following supplementary notes from the above description.

Supplementary Note 1

An imaging apparatus comprising a wireless module in which a wireless antenna is installed, a flat cable, and a metal housing in which the wireless module and the flat cable are provided, wherein the wireless antenna is disposed at a position where the wireless antenna does not overlap with the flat cable as seen along a first direction, and the wireless antenna is disposed at a position where the wireless antenna overlaps with a through-hole for the flat cable, the through-hole being formed in the metal housing.

Supplementary Note 2

The imaging apparatus described in Supplementary Note 1, in which the wireless module is disposed at a position where the wireless module overlaps with the through-hole as seen along the first direction.

Supplementary Note 3

The imaging apparatus described in Supplementary Note 1 or 2, in which, in a case where a surface of an apparatus main body in which an imaging lens is disposed is a first surface, the first direction is a direction as seen from the first surface.

Supplementary Note 4

The imaging apparatus described in any one of Supplementary Notes 1 to 3, in which, in a case where a surface of an apparatus main body in which an imaging lens is disposed is a first surface and a surface of the apparatus main body that faces the first surface is a second surface, the first direction is a direction as seen from the second surface.

Supplementary Note 5

The imaging apparatus described in Supplementary Note 1 or 2, in which, in a case where a surface of an apparatus main body in which an imaging lens is disposed is a first surface, a surface of the apparatus main body that faces the first surface is a second surface, and a surface of the apparatus main body that connects the first surface and the second surface to each other and on which an operation member is not disposed is a third surface, the first direction is a direction as seen from the third surface.

Supplementary Note 6

The imaging apparatus described in Supplementary Note 5, in which the operation member is disposed on a surface other than the third surface.

Supplementary Note 7

The imaging apparatus described in any one of Supplementary Notes 1 to 6, in which the flat cable is connected to the wireless module.

Supplementary Note 8

The imaging apparatus described in Supplementary Note 7, in which the wireless module includes a substrate on which the wireless antenna is mounted, and the flat cable is connected to the wireless module via the substrate.

Supplementary Note 9

The imaging apparatus described in any one of Supplementary Notes 1 to 8, in which the flat cable has a shape that does not cover the wireless antenna as seen along the first direction.

Supplementary Note 10

The imaging apparatus described in Supplementary Note 9, in which a cutout for avoidance of the wireless antenna is formed at the flat cable.

Supplementary Note 11

The imaging apparatus described in Supplementary Note 10, in which a direction in which a wiring line in the flat cable extends changes at a position facing the wireless antenna as seen along the first direction.

Supplementary Note 12

The imaging apparatus described in Supplementary Note 10 or 11, in which a wiring line in the flat cable is bent at a position facing the wireless antenna as seen along the first direction.

Supplementary Note 13

The imaging apparatus described in any one of Supplementary Notes 1 to 12, in which the wireless module has a rectangular shape and is disposed to be inclined with respect to a wiring direction of the flat cable.

Regarding the present disclosed technology, the above-described various embodiments and/or various modification examples can be combined with each other as appropriate. It is needless to say that the technique of the present disclosed technology is not limited to each of the embodiments described above and various configurations can be employed without departing from the gist.

Contents described and illustrated above are for detailed description of a part according to the present disclosed technology and are merely an example of the present disclosed technology. For example, description of the above-described configurations, functions, actions, and effects is description related to an example of configurations, functions, actions, and effects of a part according to the present disclosed technology. Therefore, it is a matter of course that an unnecessary part of the contents described and illustrated above may be deleted, a new element may be added, and replacement may be made without departing from the point of the present disclosed technology. In addition, in order to avoid complication and facilitate the understanding of a portion according to the present disclosed technology, regarding the contents described and illustrated above, description related to common technical knowledge or the like which does not need to be described to enable implementation of the present disclosed technology has been omitted.

In the present specification, the term “A and/or B” is synonymous with the term “at least one of A or B”. That is, the term “A and/or B” means only A, only B, or a combination of A and B. In addition, in the present specification, the same approach as “A and/or B” is applied to a case where three or more matters are represented by connecting the matters with “and/or”.

All documents, patent applications, and technical standards described in the present specification are incorporated in the present specification by reference to the same extent as in a case where each of the documents, patent applications, technical standards are specifically and individually indicated to be incorporated by reference.

What is claimed is:

1. An imaging apparatus comprising:

a wireless module in which a wireless antenna is installed;

a flat cable; and a metal housing in which the wireless module and the flat cable are provided, in which the wireless antenna is disposed at a position where the wireless antenna does not overlap with the flat cable as seen along a first direction, and the wireless antenna is disposed at a position where the wireless antenna overlaps with a through-hole for the flat cable, the through-hole being formed in the metal housing, wherein a cutout for avoidance of the wireless antenna is formed at the flat cable.

2. The imaging apparatus according to claim 1, wherein the wireless module is disposed at a position where the wireless module overlaps with the through-hole as seen along the first direction.

3. The imaging apparatus according to claim 1, wherein, in a case where a surface of an apparatus main body in which an imaging lens is disposed is a first surface, the first direction is a direction as seen from the first surface.

4. The imaging apparatus according to claim 1, wherein, in a case where a surface of an apparatus main body in which an imaging lens is disposed is a first surface and a surface of the apparatus main body that faces the first surface is a second surface, the first direction is a direction as seen from the second surface.

5. The imaging apparatus according to claim 1, wherein, in a case where a surface of an apparatus main body in which an imaging lens is disposed is a first surface, a surface of the apparatus main body that faces the first surface is a second surface, and a surface of the apparatus main body that connects the first surface and the second surface to each other and on which an operation member is not disposed is a third surface, the first direction is a direction as seen from the third surface.

6. The imaging apparatus according to claim 5, wherein the operation member is disposed on a surface other than the third surface.

7. The imaging apparatus according to claim 1, wherein the flat cable is connected to the wireless module.

8. The imaging apparatus according to claim 7, wherein the wireless module includes a substrate on which the wireless antenna is mounted, and the flat cable is connected to the wireless module via the substrate.

9. The imaging apparatus according to claim 1, wherein the flat cable has a shape that does not cover the wireless antenna as seen along the first direction.

10. The imaging apparatus according to claim 1, wherein a direction in which a wiring line in the flat cable extends changes at a position facing the wireless antenna as seen along the first direction.

11. The imaging apparatus according to claim 1, wherein a wiring line in the flat cable is bent at a position facing the wireless antenna as seen along the first direction.

12. The imaging apparatus according to claim 1, wherein the wireless module has a rectangular shape and is disposed to be inclined with respect to a wiring direction of the flat cable.

13. An imaging apparatus comprising:

a wireless module in which a wireless antenna is installed;

a flat cable; and a metal housing in which the wireless module and the flat cable are provided, in which the wireless antenna is disposed at a position where the wireless antenna does not overlap with the flat cable as seen along a first direction, and the wireless antenna is disposed at a position where the wireless antenna overlaps with a through-hole for the flat cable, the through-hole being formed in the metal housing, wherein, in a case where a surface of an apparatus main body in which an imaging lens is disposed is a first surface, a surface of the apparatus main body that faces the first surface is a second surface, and a surface of the apparatus main body that connects the first surface and the second surface to each other and on which an operation member is not disposed is a third surface, the first direction is a direction as seen from the third surface.

* * * * *